United States Patent [19]
Rieth et al.

[11] 3,893,348
[45] July 8, 1975

[54] SAFETY STEERING FOR MOTOR VEHICLES

[75] Inventors: Egon Rieth, Boblingen; Béla Barényi, Maichingen, both of Germany

[73] Assignee: Daimler-Benz Aktiengesellschaft, Germany

[22] Filed: Apr. 2, 1974

[21] Appl. No.: 457,381

[30] Foreign Application Priority Data
Apr. 3, 1973 Germany.......................... 2316515

[52] U.S. Cl. ............................................... 74/492
[51] Int. Cl. ............................................... B62d 1/18
[58] Field of Search ............................ 74/492, 493

[56] References Cited
UNITED STATES PATENTS
3,028,766  4/1962  Musilli .................... 74/492
3,803,938  4/1974  Bratke et al. ............ 74/492

FOREIGN PATENTS OR APPLICATIONS
932,027  7/1963  United Kingdom.................. 74/492

*Primary Examiner*—Allan D. Herrmann
*Attorney, Agent, or Firm*—Craig & Antonelli

[57] ABSTRACT

A safety steering arrangement for motor vehicles in which a plastically deformable deformation member is arranged between the steering wheel and the upper end of the steering shaft; an upper part of the steering shaft is thereby so supported at a fixed vehicle part that it can be pivoted into such a position under the influence of forces engaging at the steering wheel which are smaller than the forces necessary for the deformation of the deformation member, that its center longitudinal axis extends approximately horizontally or the plane of the steering wheel extends approximately vertically while means are provided in the connection of the steering shaft which enable the pivoting of the upper part of the steering shaft with respect to a further part thereof.

19 Claims, 6 Drawing Figures

SAFETY STEERING FOR MOTOR VEHICLES

The present invention relates to a safety steering for motor vehicles in which a deformation member plastically deformable upon impact thereagainst of the driver and preferably consisting of sheet metal is arranged between the steering wheel and the upper end of the steering shaft.

It is known that such deformation members which are also designated as impact pots offer the greatest possible protection to the driver impinging against the steering wheel during an accident, if the upper body of the driver impinges approximately in the plane of the steering wheel against the latter and the deformation member is acted upon approximately in the direction of its center longitudinal axis. In practice, however, this generally takes place in such a manner that for various reasons the steering wheel cannot be arranged steeply enough and the impact of the driver therefore takes place in a first accident phase exclusively against the lower part of the steering wheel rim. This has as a consequence that the impact energy has to be absorbed by a very small body surface—a padded plate provided approximately in the center area of the steering wheel may thereby be completely ineffectual under certain circumstances—and that furthermore the deformation member buckles as a result of the one-sided load and does not bring about the energy absorption for which it is designed.

The present invention is therefore concerned with the task to avoid these disadvantages of the known steering arrangements and to create a safety steering for motor vehicles which in case of an accident enables an easy adjustability of the angle of inclination of the steering wheel and thus effectively contributes to the protection of the driver of the vehicle.

The underlying problems are solved according to the present invention in that an upper part of the steering shaft is so supported at a fixed vehicle part that it can be pivoted into such a position under the influence of forces engaging at the steering wheel which are smaller than the forces necessary for the deformation of the deformation member, that its center longitudinal axis extends approximately horizontally or the plane of the steering wheel extends approximately vertically, and that means are provided in the train of the steering shaft which enable the pivoting of the upper part of the steering shaft with respect to a further part thereof.

By the use of such an arrangement, a dangerous tumbling movement of the steering wheel is at least far-reachingly avoided, as would occur otherwise if during the impact of the driver, for example, against the lower part of the steering wheel, the deformation member bends or buckles unilaterally and the steering wheel is subsequently still further rotated by shocks and impacts acting on the wheels of the vehicle during the accident.

The pivoting of the individual parts of the steering shaft with respect to one another can thereby be made possible by a torsion-resistant deformation member connecting two parts thereof, which is preferably constructed corrugated, i.e., of undulated shape.

The additional advantage is thereby obtained that in case of a stronger deformation of the deformation member arranged in the train of the steering shaft and of the bearing support of the steering shaft, the latter is blocked and the driver is not injured by a continuing rotating steering wheel which, under certain circumstances, might still be tumbling somewhat. This blocking can take place with a steering shaft which is not variable in its length, also by a force interaction from the deforming front portion of the vehicle.

The pivoting of the parts of the steering shaft with respect to one another may, however, also be made possible by a Cardan joint or possibly also by several Cardan joints.

The bearing support of the upper part of the steering shaft connected with the steering wheel may take place advantageously at a deformation member fixed at the vehicle. In this manner, a pivoting of the steering wheel with simultaneous energy absorption is made possible thereby without significant structural expenditures.

However, the upper part of the steering shaft connected with the steering wheel may also be supported in a rocker pivotal about a vehicle cross axis and may be connected with an adjoining part of the steering shaft by way of a Cardan joint.

An abutment as well as additionally a deformation member may be provided thereby preferably for the prevention of an upward pivoting of the rocker, which deformation member is deformed during a pivoting of the rocker in the downward direction.

Furthermore, the possiblity also exists to support the upper part of the steering shaft connected with the steering wheel at a slide carriage or guide which is pivotal with respect to fixed vehicle parts under interposition of roller bodies.

With such an arrangement, it may be necessary that the upper part of the steering shaft connected with the steering wheel is connected with a lower part thereof by way of an intermediate member adjustable in its length and provided at its two ends with Cardan or universal joints.

In order to create also a certain movability of the lower part of the steering shaft, the latter may also be supported preferably in pivot bearings.

Finally, it may be of advantage if the outer column of the steering system is pivotally suspended together with the steering shaft supported therein about a fixed cross axis.

Accordingly, it is an object of the present invention to provide a safety steering for motor vehicles which avoids by simple means the aforementioned shortcomings and drawbacks encountered in the prior art.

Another object of the present invention resides in a safety steering system for motor vehicles which permits the steering wheel to be deflected by a one-sided impact of the body of the driver into its position most favorable for the absorption of the impact energy.

A further object of the present invention resides in a safety steering arrangemenet for motor vehicles in which the full effectiveness of the energy absorption of the deformation members is assured regardless of the direction of impact of the body of the driver against the steering wheel.

Still a further object of the present invention resides in a safety steering arrangement which enables a ready adjustment of the angle of inclination of the steering wheel during ]n accident, thus contributing 2ignificantly to the protection of the driver.

Another object of the present invention resides in a safety steering system of the type described above in which 4angerous tumbling 4ovements 6f the steering wheel subsequent to the accident are avoided.

Still another object of the present invention resides in a safety steering arrangement for motor vehicles in which the rotation of the steering wheel, caused by forces acting on the wheels after the accident, is effectively prevented thereby lessening the danger of injury due to such subsequent rotation.

A still further object of the present invention resides in a safety steering of the type described above which is simple in construction, yet is operationally reliable and maximizes the safety features thereof.

These and further objects, features and advantages of the present invention will become more apparent from the following description when taken in connection with the accompanying drawing which shows, for purposes of illustration only, several embodiments in accordance with the present invention and wherein.

Figure 1:
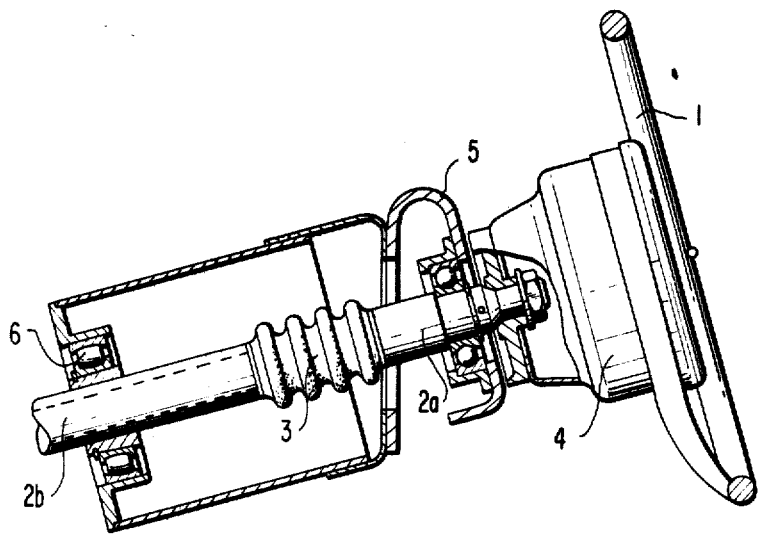
FIG. 1 is a side elevational view, partly in cross section, of a safety steering according to the present invention, in the normal position thereof.
Figure 2:
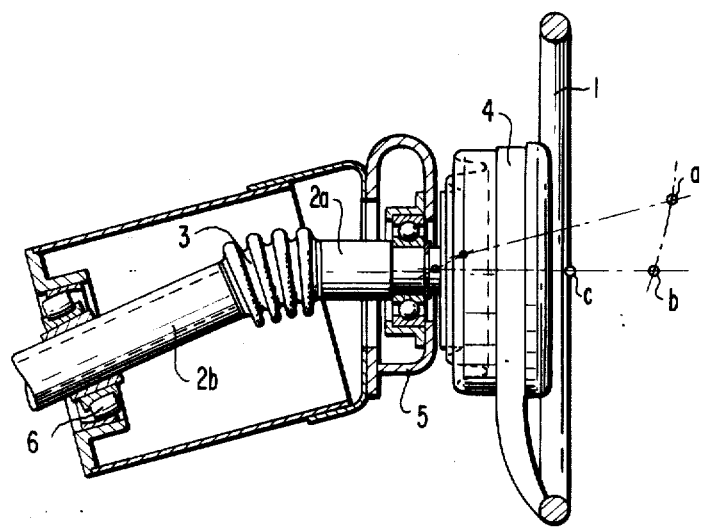
FIG. 2 is a side elevational view of the safety steering according to FIG. 1 in its position after an accident.

Referring now to the drawing wherein like reference numerals are used throughout the various views and more particularly to FIGS. 1 and 2, in the safety steering arrangement illustrated in these two figures, reference numeral 1 designates therein a steering wheel while reference numeral 2 designates therein a subdivided steering shaft whose upper part 2a and lower part 2b are connected with each other by a deformation member 3 of corrugated or undulated construction. A further deformation member 4 of any conventional construction is arranged between the steering wheel 1 and the upper part 2a of the divided steering shaft 2. The upper part 2a of the steering shaft 2 is supported at a curved, deformable structural member 5 fixed at the vehicle whose strength and rigidity is so selected that during an impact of the driver against the steering wheel 1 it is transformed into the position illustrated in FIG. 2 before the deformation member 4 deforms. Consequently, the point a (FIG. 2) thereby moves by way of point b toward the point c under the effect of an impact of the driver caused by an accident. The lower part 2b of the steering shaft 2 is thereby supported in a pivot bearing 6 of any conventional construction in order to enable the necessary angular changes.

Figure 3:
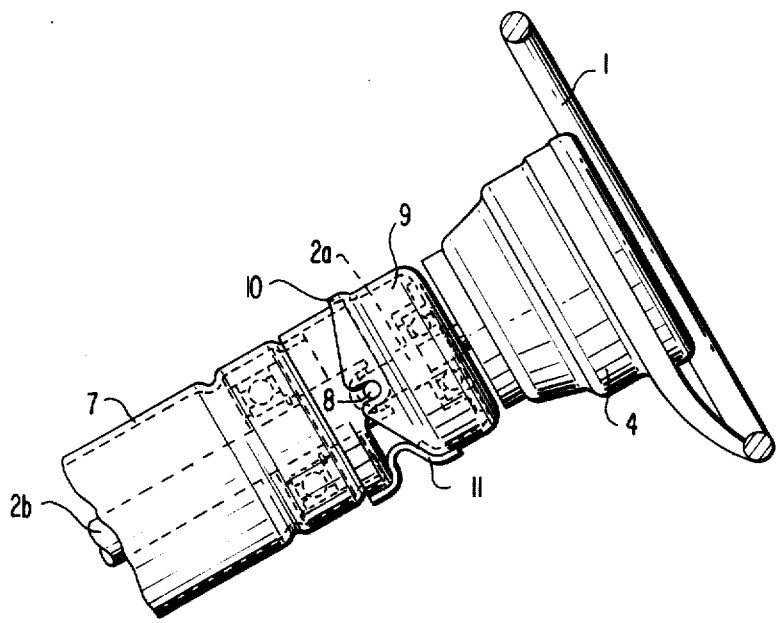
FIG. 3 is a side elevational view of a modified embodiment of a safety steering according to the present invention provided with a rocker.

In the embodiment of the present invention illustrated in FIG. 3, the lower part 2b of the steering shaft 2 which is supported in the outer column 7, terminates in a Cardan joint 8 whose rear portion (steering shaft part 2a) is rotatably supported in a rocker 9 of any conventional construction, whereby the rocker 9 pivots about points disposed on both sides of the steering shaft 2 which are disposed on a single line with the point of rotation of the Cardan joint 8 and together with the same form a common horizontal axis transverse to the longitudinal axis of the vehicle (not shown). A tilting up is prevented by an abutment 10 whereas the movement in the downward direction is braked by a deformation member of any conventional type, constructed in the illustrated embodiment as clip.

Figure 4:
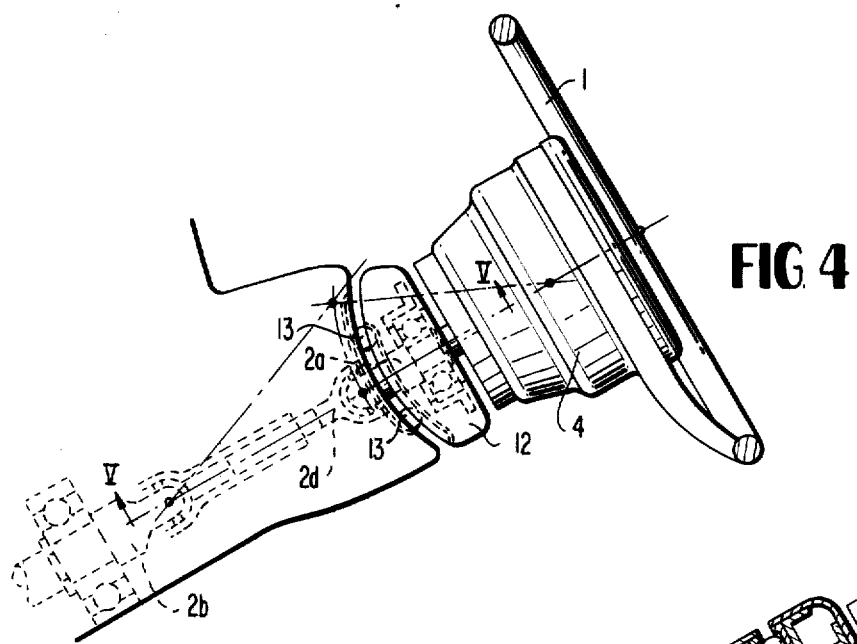
FIG. 4 is a side elevational view of another embodiment of a safety steering of the present invention with a slide carriage running on roller bodies.
Figure 5:
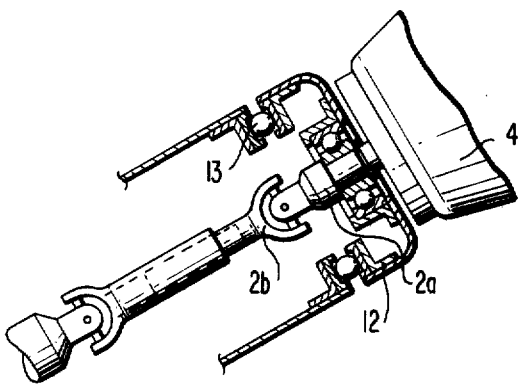
FIG. 5 is a cross-sectional view taken along line V—V of FIG. 4.

In the embodiment according to FIG. 4, the deformation member pivots along a circular arc on a slide carriage 12 which is supported on roller bodies 13. The guide tracks for the roller bodies 13 are disposed on both sides of the steering shaft 2 (see FIG. 5) and permit to the slide carriage 12 to pivot up only so far until the steering wheel 1 comes into the vertical position. A double joint enables the steering shaft 2 to be offset upwardly in the case of a collision. Since the two points of the joints move away from one another during the movement progress, the part 2d of the steering shaft 2 is variable in its length.

Figure 6:
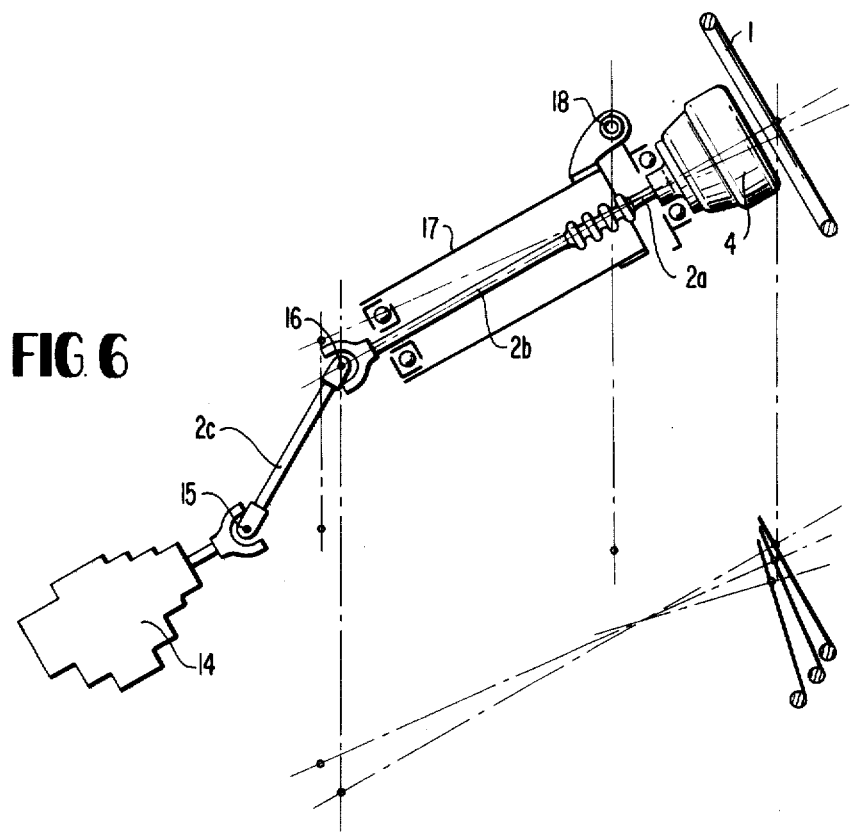
FIG. 6 is a somewhat schematic side elevational view of a still further embodiment of a safety steering according to the present invention with an outer column pivotally suspended about a cross axis.

Finally, FIG. 6 illustrates an arrangement with a steering gear 14 disposed relatively far forwardly, which is adjoined by two Cardan joints 15 and 16, with which the steering shaft 2 is provided.

In case of a collision, the steering gear 14 is displaced rearwardly whence the part 2c of the steering shaft 2 is raised up into the position shown in dash and dotted line; as a result thereof, the rear steering shaft part 2b is pivoted upwardly into a more horizontal position since it is guided in an outer column 17 which is supported at the body by means of a joint 18. The steering wheel 1 pivots about the axis of this joint 18, which extends transversely to the longitudinal axis of the motor vehicle (not shown), after the impact of the driver into an approximately vertical position.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety steering for motor vehicles which includes a steering shaft means, a steering wheel and a deformation means plastically deformable in case of an impact of the driver, said deformation means being arranged between the steering wheel and the upper end of the steering shaft means, characterized by means for mounting an upper part of the steering shaft means at a fixed vehicle part in such a manner that it can be pivoted under the influence of forces engaging at the steering wheel which are smaller than the forces necessary for the deformation of the deformation means into such a position that its center longitudinal axis extends approximately horizontally or the plane of the steering wheel extends approximately vertically, and in that further means are provided in the train of the steering shaft means which enable the pivoting of the upper part of the steering shaft means with respect to a further part thereof.

2. A safety steering according to claim 1, characterized in that the deformation means consists of sheet metal.

3. A safety steering according to claim 1, characterized in that the further means includes a torsion resistant deformation member arranged in the train of the multi-partite steering shaft means, said deformation member operatively connecting two parts of said multipartite steering shaft means.

4. A safety steering according to claim 3, characterized in that the deformation member is of corrugated construction.

5. A safety steering according to claim 1, characterized in that said further means includes at least one Cardan joint means arranged in the train of the multipartite steering shaft means.

6. A safety steering according to claim 3, characterized in that the upper part of the steering shaft means connected with the steering wheel is supported at a deformation member mounted at a relatively fixed vehicle part.

7. A safety steering according to claim 1, characterized in that the upper part of the steering shaft means connected with the steering wheel is supported in a rocker means pivotal about a substantially transverse vehicle axis and is connected with an adjoining part of the steering shaft means by way of a Cardan joint means.

8. A safety steering according to claim 7, characterized in that an abutment is provided for preventing a pivoting up of the rocker means.

9. A safety steering according to claim 7, characterized in that a deformation member is provided which is deformed during a pivoting of the rocker means in the downward direction.

10. A safety steering according to claim 9, characterized in that said deformation means is in the form of a clip.

11. A safety steering according to claim 9, characterized in that an abutment is provided for preventing a pivoting up of the rocker means.

12. A safety steering according to claim 1, characterized in that the upper part of the steering shaft means connected with the steering wheel is supported on a slide carriage means which is pivotal with respect to fixed vehicle parts under interposition of roller means.

13. A safety steering according to claim 12, characterized in that the upper part of the steering shaft means connected with the steering wheel is connected with a lower part thereof by way of an intermediate member variable in its length and provided at its two ends with Cardan joint means.

14. A safety steering according to claim 1, characterized in that the lower part of the steering shaft means is supported in pivot bearing means.

15. A safety steering with an outer column according to claim 14, characterized in that the outer column together with the steering shaft means supported therein is pivotally suspended about a cross axis fixed at the vehicle.

16. A safety steering according to claim 1, characterized in that the upper part of the steering shaft means connected with the steering wheel is supported at a deformation member mounted at a relatively fixed vehicle part.

17. A safety steering according to claim 1, characterized in that the upper part of the steering shaft means connected with the steering wheel is connected with a lower part thereof by way of an intermediate member variable in its length and provided at its two ends with Cardan joint means.

18. A safety sterring with an outer column according to claim 1, tharacterized zn that the outer column together with the steering shaft means supported therein is pivotally suspended about a cross axis fixed at the vehicle.

19. A safety steering according to claim 3, characterized in that the lower part of the steering shaft means is supported in pivot bearing means.

* * * * *